United States Patent [19]

Anders et al.

[11] Patent Number: 5,653,122
[45] Date of Patent: Aug. 5, 1997

[54] FREEZING APPARATUS

[75] Inventors: Gary H. Anders, Lowell; Hilton L. Bell, Jr., Berryville, both of Ark.

[73] Assignee: Tyson Holding Company, Wilmington, Del.

[21] Appl. No.: 447,910

[22] Filed: May 23, 1995

Related U.S. Application Data

[63] Continuation of Ser. No. 188,964, Jan. 27, 1994, abandoned.

[51] Int. Cl.⁶ ..................................................... F25D 23/06
[52] U.S. Cl. ........................... 62/451; 62/457.1; 220/254; 220/441; 220/444

[58] Field of Search ........................ 62/249, 255, 440, 62/451, 452, 457.1, 458, 455; 206/595, 600, 386; 220/444, 440, 442, 903, 908, 254

*Primary Examiner*—Henry A. Bennett
*Assistant Examiner*—Susanne C. Tinker
*Attorney, Agent, or Firm*—Dennis D. Brown

[57] ABSTRACT

A freezing apparatus comprising: a container having an opening at the top thereof; a cover removably positionable over the opening; and a cooling unit which includes a cooling element and an air circulating fan. The cover has a port provided therein for receiving the cooling element and air circulation fan.

33 Claims, 9 Drawing Sheets

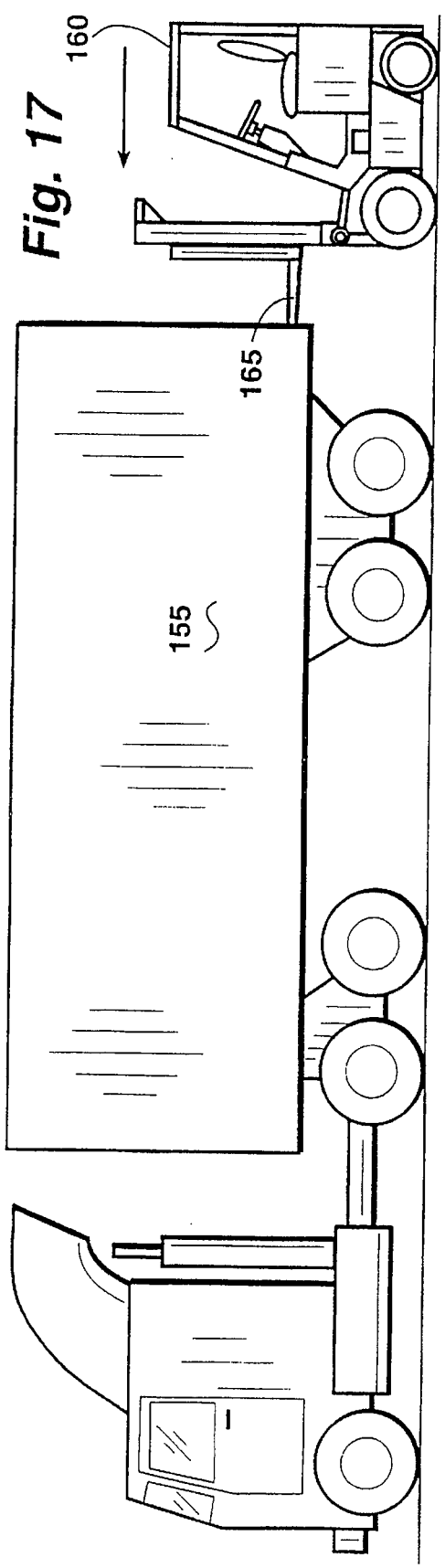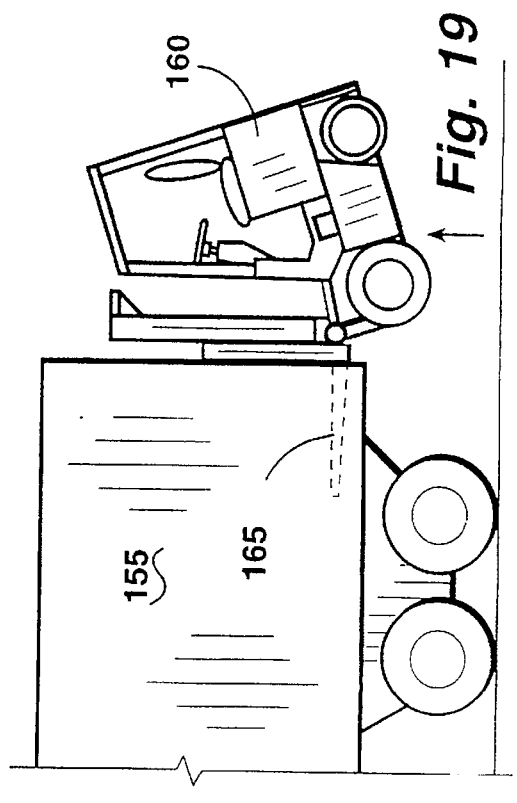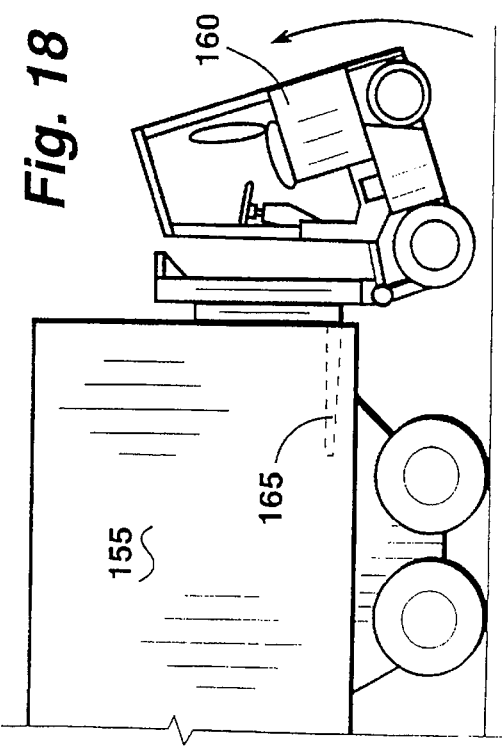

FREEZING APPARATUS

This is a continuation of application Ser. No. 08/188,964 filed on Jan. 27, 1994, now abandoned.

FIELD OF THE INVENTION

In one aspect, the present invention relates to freezer systems. In another aspect, the present invention relates to methods of processing and/or disposing of animal carcasses.

BACKGROUND OF THE INVENTION

In poultry growing operations, as well as other types of livestock growing operations, many animals typically die during the growing process. Various methods have been used heretofore to dispose of these dead animals. In poultry growing operations, for example, dead birds have commonly been disposed of by landfill dumping, dry composting, wet composting, or incineration. Unfortunately, each of these disposal methods is environmentally undesirable and/or creates other substantial problems.

Incineration is typically the least desirable method of disposing of animal carcasses. Incineration generally produces nothing of value. Rather, such processes yield undesirable ash and combustion gas products.

Composting has heretofore been the most environmentally desirable carcass disposal method. In a dry composting method, animal carcasses are piled in a containment vessel and are treated with a dry bacterial composition. The bacteria operate to accelerate the carcass decomposition process. In a wet composting method, animal carcasses are placed in an enzymatic slurry. The composted products produced by wet and dry composting methods typically have significant soil enrichment value. However, the application of these waste products to the soil also has some negative environmental impact. Further, carcass composting processes create substantial odor problems.

Landfill disposal is the most commonly used method of disposing of bird and other animal carcasses. It is estimated that approximately 250 million pounds per year of bird carcasses from poultry operations are disposed of in landfills. Unfortunately, landfill disposal of animal carcasses creates a potential source of groundwater contamination. Additionally, the landfill dumping process provides an opportunity for scavengers to carry off carcasses and thereby spread diseases to the wild animal population. Further, due to these and other problems, landfill disposal of animal carcasses is no longer permitted in some states.

Thus, a need presently exists for a carcass disposal and/or processing method which has a minimal negative environmental impact. Additionally, a need presently exists for a method of processing animal carcasses wherein a valuable end product is obtained and the amount of actual waste material remaining is minimized. Further, a need presently exists for a carcass disposal method which enhances the farm environment and prevents the transmission of diseases.

SUMMARY OF THE INVENTION

The present invention provides a freezing apparatus comprising: a container having an opening at the top thereof; a cover removably positionable over the opening; and a cooling unit which includes a means for cooling and circulating air within the freezing apparatus. The cover has a port provided therein for receiving the cooling and circulation means.

The present invention also provides a method of processing the carcasses of animals which die during the course of a grow-out operation. The inventive method comprises the steps of: (a) collecting and freezing carcasses in a freezing apparatus and (b) transporting the frozen carcasses to a processing facility. It is preferred that (1) the processing facility referred to in step (b) is a rendering facility and (2) the method further comprises the step of (c) rendering the carcasses.

The present invention provides substantial advantages over the carcass disposal/processing systems heretofore used in the art. The inventive carcass disposal/processing method substantially eliminates all of the adverse environmental effects previously associated with carcass disposal methods. Additionally, the inventive method (a) totally isolates dead carcasses from the remaining live animals so that disease transmission is prevented, (b) effectively preserves the carcass material prior to processing by freezing so that the protein and rendering value of the carcass material is maintained, (c) provides a valuable high-protein end product, (d) utilizes substantially all of the carcass material so that substantially no waste product remains, and (e) enhances the farm environment by eliminating the odor problems heretofore associated with other disposal/processing methods. The inventive method can be used in essentially any grow-out operation wherein carcass disposal is required.

The inventive freezing apparatus greatly enhances the inventive carcass disposal method by providing an ideal carcass freezing and storage unit which is easy to use, handle, and maintain.

Further objects, features, and advantages of the present invention will be apparent to those skilled in the art upon reference to the accompanying drawings and upon reading the following description of the preferred embodiments.

BRIEF DESCRIPTION OF THE DRAWINGS

FIGS. 17, 18, and 19 depict forklift 160 being mounted on the back of truck 155 for transporting forklift 160 from farm site to farm site.

DESCRIPTION OF THE PREFERRED EMBODIMENTS

Figure 2:
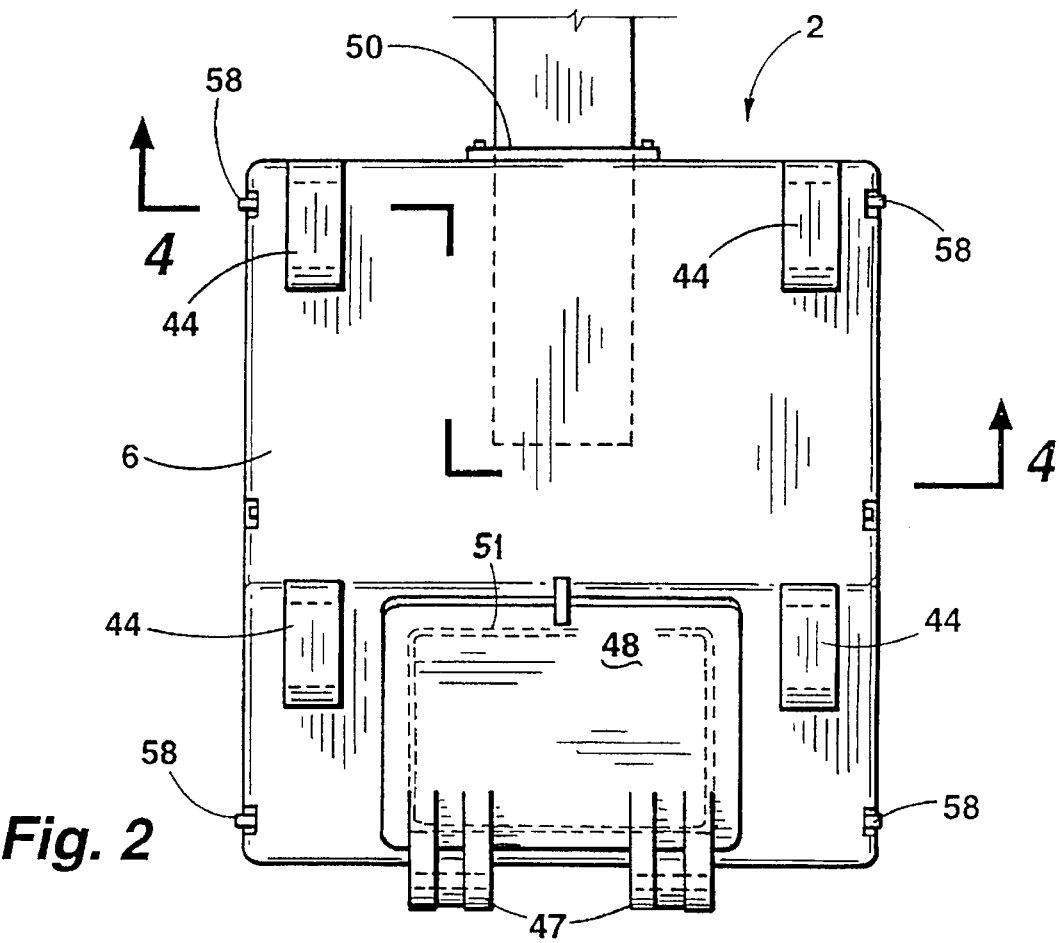
FIG. 2 provides a top view of inventive apparatus 2.
Figure 1:
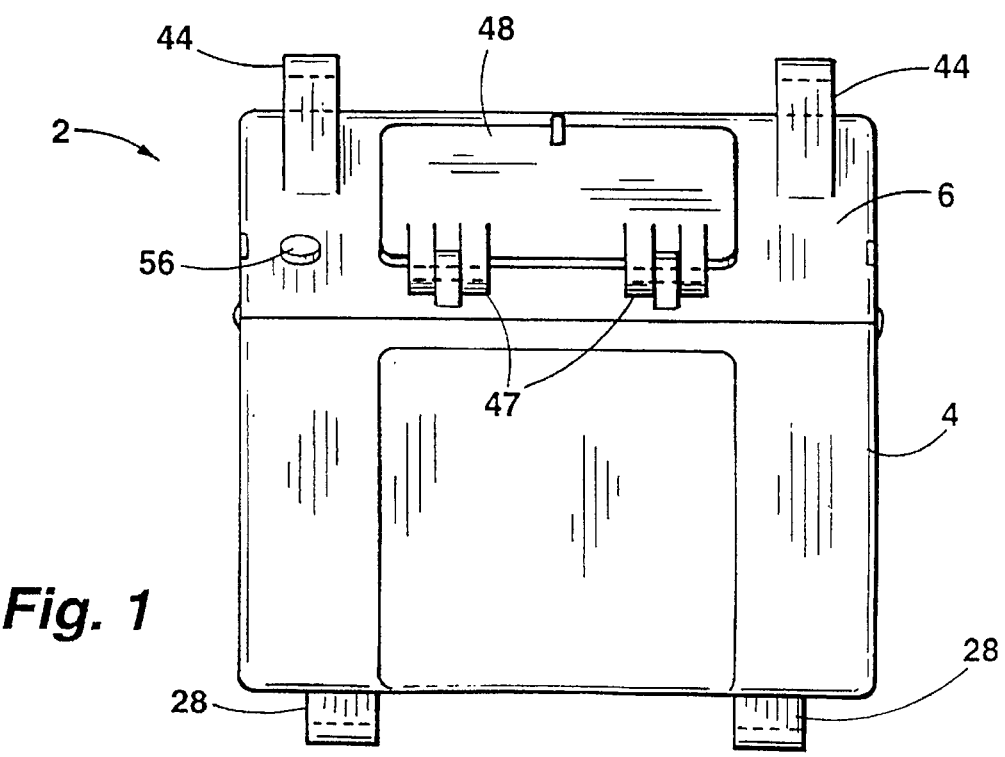
FIG. 1 provides an elevational front view of an embodiment 2 of the inventive freezing apparatus.

An embodiment 2 of the inventive cooling/freezing apparatus is depicted in FIGS. 1–12. Inventive freezing apparatus 2 comprises a freezer box or container 4, a cover 6, and a cooling/freezing unit 8.

Freezer box 4 includes an outer wall 10, an inner wall 12, and an insulation layer 14 provided between walls 10 and 12. All of the interior corners in freezer box 4 are preferably rounded to facilitate cleaning. Walls 10 and 12 are preferably formed from fiberglass or a plastic material such as polyethylene. Insulation layer 14 can generally be formed from any insulating material used in the construction of freezer systems. Insulation layer 14 is preferably a layer of polyurethane foam having a thickness of approximately three inches.

False walls 16 and a false bottom 17 are preferably secured inside freezer box 4. False walls 16 and false bottom 17 preferably have air flow ridges 19 formed therein. False walls 16 and false bottom 17 operate to separate the animal carcasses placed in freezer box 4 from inner wall 10 such that cold air circulation is maintained around and under the animal carcasses. Grooves 21 are formed in inner wall 10 to channel circulatory air flow beneath false bottom 17.

Apertures 20 are preferably provided in false bottom 17 to facilitate liquid drainage. False walls 16 and false bottom 17 are preferably formed from aluminum sheet metal or like material which provides a smooth, easily cleanable, sanitary contact surface.

As will be readily understood by those skilled in the art, false walls 16 and false bottom 17 can optionally be replaced with a continuous liner which covers the interior sides and bottom of freezer box 4 such that an air flow gap is provided between the liner and the interior sides and bottom of freezer box 4.

Freezer box 4 further comprises: a drainage port 22 positioned near the bottom of the freezer box; an interior floor 24 which is sloped toward the drainage port; captive-type forklift pockets 28 provided on the bottom of freezer box 4; an upper rim 30 provided around the top of freezer box 4; and an air seal 32 provided along rim 30 for sealing the connection between freezer box 4 and cover 6. Drainage port 22 and sloped floor 24 are provided in freezer box 4 primarily for facilitating the cleaning of freezer box 4 between loadings. As will be discussed more fully hereinbelow, captive-type forklift pockets 28 are provided on the bottom of freezer box 4 so that the contents of freezer box 4 can be dumped into a truck or other transportation means by lifting and rotating freezer box 4 using a forklift in the manner depicted in FIGS. 11 and 12.

Cover 6 comprises: an outer wall 34; an inner wall 36; an insulation layer 38 provided between outer wall 34 and inner wall 36; a lower rim 40 which mates with upper rim 30 of freezer box 4 for sealingly connecting cover 6 to box 4; and a dome-shaped interior 42. As with the inner and outer walls of freezer box 4, outer wall 34 and inner wall 36 of cover 6 are preferably formed from fiberglass or a plastic material such as polyethylene. Insulation layer 38 can be formed from polyurethane foam or generally any other type of insulation material used in constructing freezer systems.

Cover 6 also preferably comprises: a hatch 46 through which animal carcasses are deposited in inventive apparatus 2; a hatch cover 48 removably positionable over hatch 46 for closing hatch 46; a hinge assembly 47 for pivotably connecting hatch cover 48 to cover 6; an air seal 51 attached to cover 6 or to hatch cover 48 such that seal 51 surrounds and seals hatch 46 when hatch 46 is closed; a port 54 extending through one side of cover 6 for associating freezing unit 8 with cover 6; a thermometer 56 operably associated with cover 6 for indicating the temperature inside freezing apparatus 2; and a plurality of (preferably four) standard mechanical latches 58 or other attachment devices for securing cover 6 to freezer box 4. Mechanical latches 58 are preferably installed at the corners of freezer box 4. Forklift pockets 44 are provided on top of cover 6 for lifting cover 6 with a forklift or similar device so that cover 6 can be placed on, or removed from, the top of freezer box 4.

As with freezer box 4 and cover 6, hatch cover 48 is preferably an insulated member having an insulation layer (e.g., a polyurethane foam layer) sandwiched between an inner wall and an outer wall.

Freezing unit 8 includes all of the basic components (i.e., a coolant compressor, a coolant evaporator coil, an evaporator fan, a condenser coil, a condenser fan, etc.) contained in a standard freezer unit. Examples of standard cooling/freezing units are disclosed in U.S. Pat. Nos. 2,489,009, 2,914,927, and 4,394,818. The entire disclosures of U.S. Pat. Nos. 2,489,009, 2,914,927, and 4,394,818 are incorporated herein by reference. Freezing unit 8 is uniquely configured, however, to (a) operate in conjunction with the remainder of freezing apparatus 2 and (b) allow easy maintenance and replacement.

Figure 3:
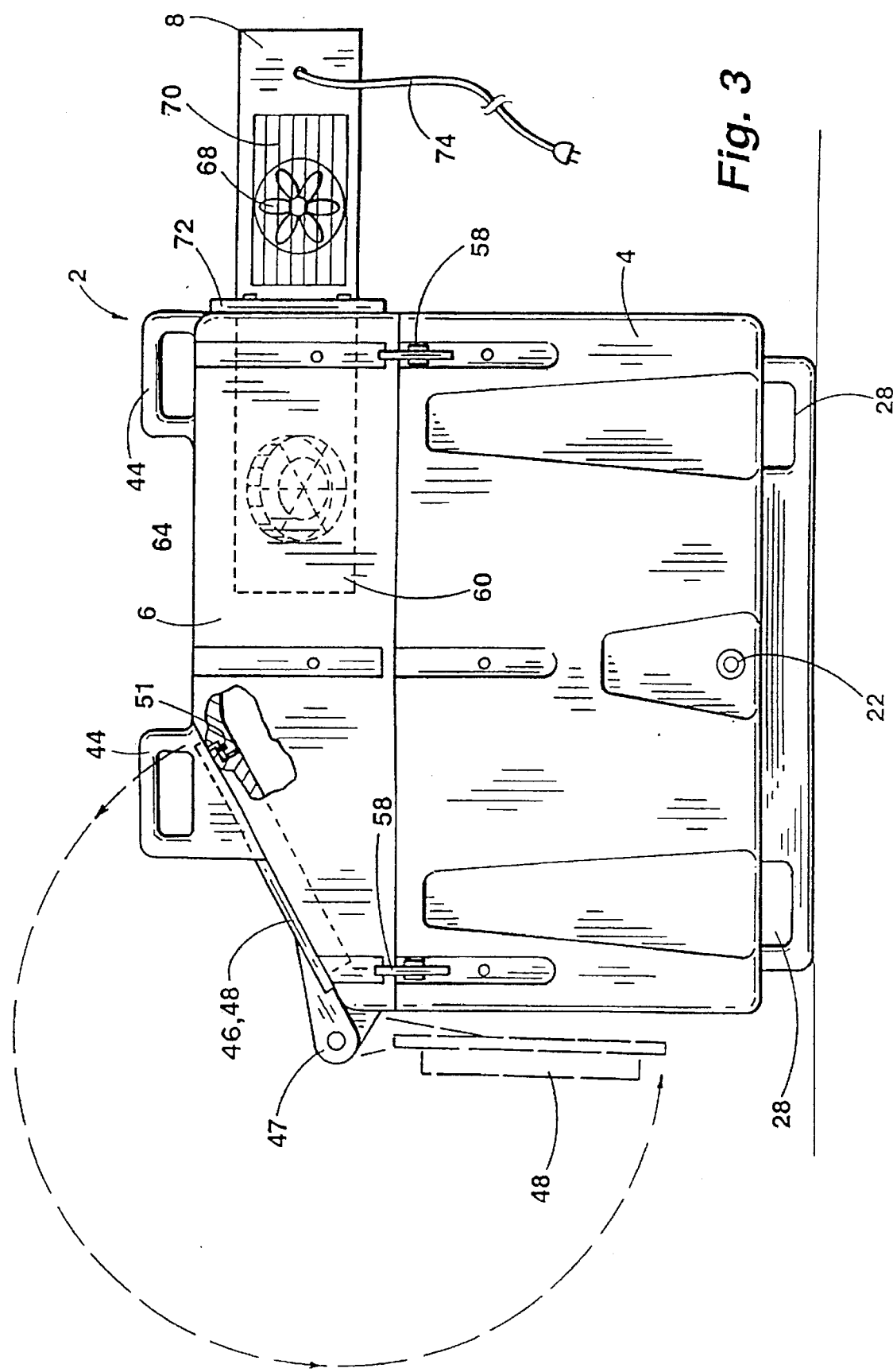
FIG. 3 provides a partially cutaway side view of inventive apparatus 2.
Figure 4:
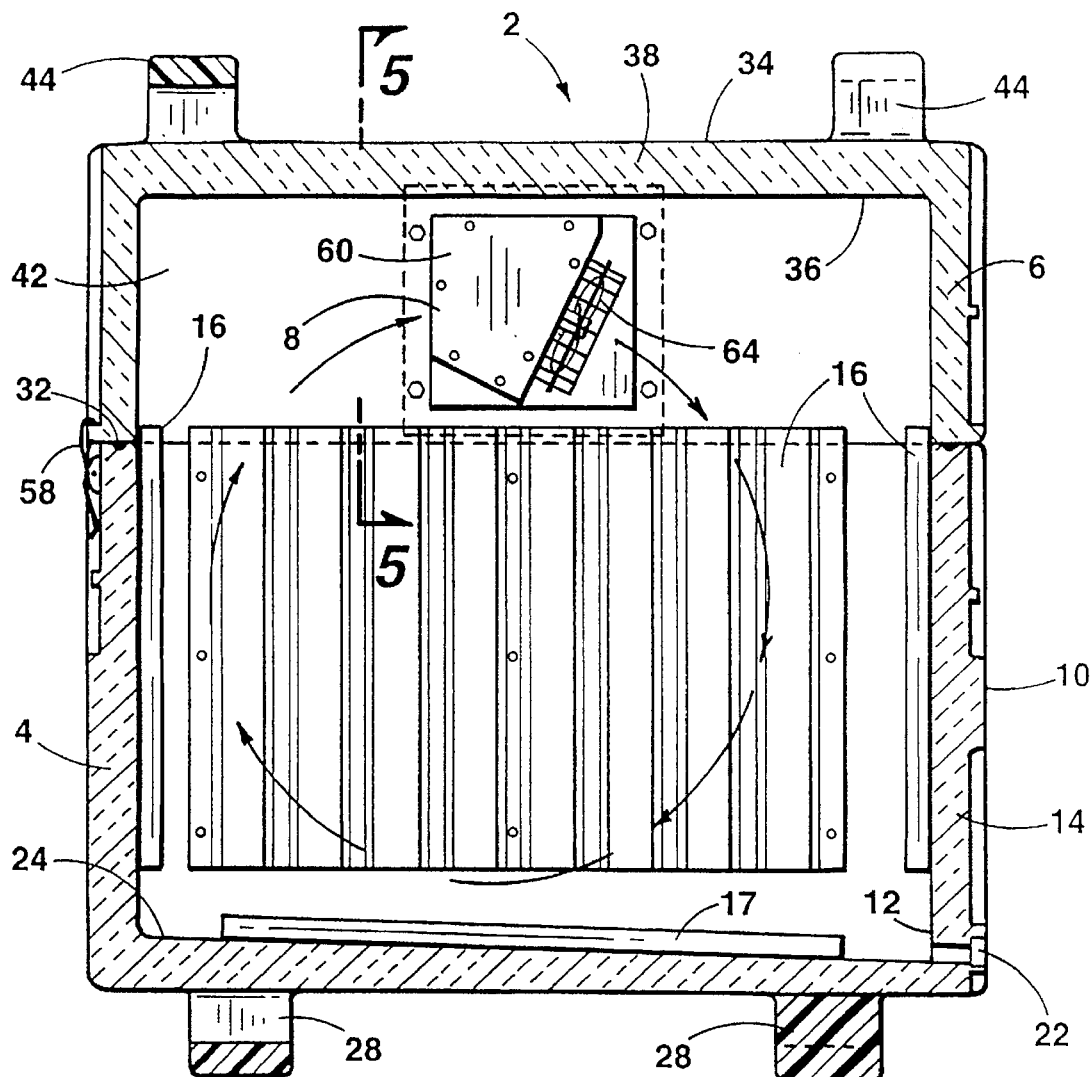
FIG. 4 provides a cutaway view of inventive apparatus 2 taken along line 4—4 shown in FIG. 2.
Figure 5:
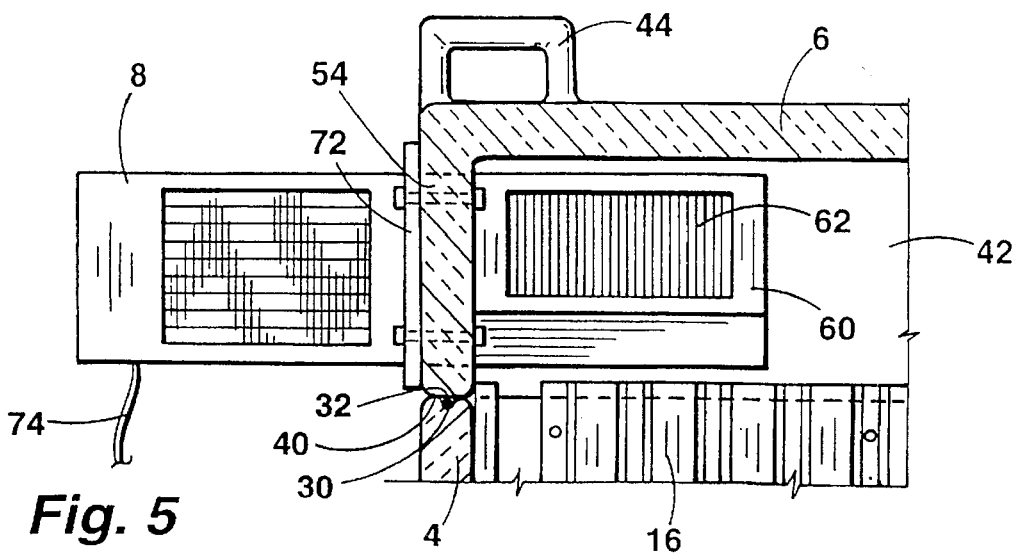
FIG. 5 provides a cutaway view of inventive apparatus 2 taken along line 5—5 shown in FIG. 4.
Figure 6:
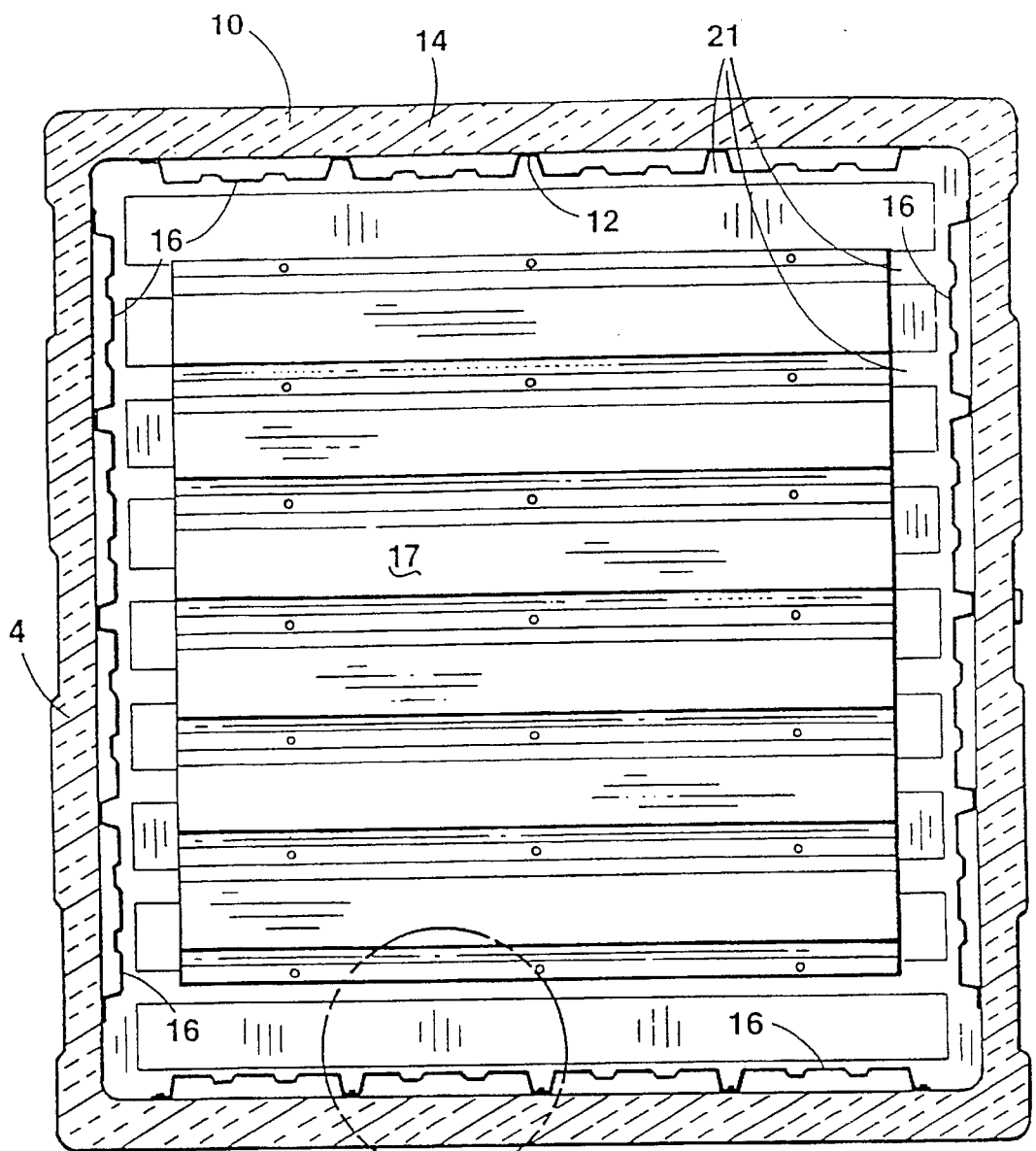
FIG. 6 provides a top cutaway view of the box portion 4 of inventive apparatus 2.
Figure 7:
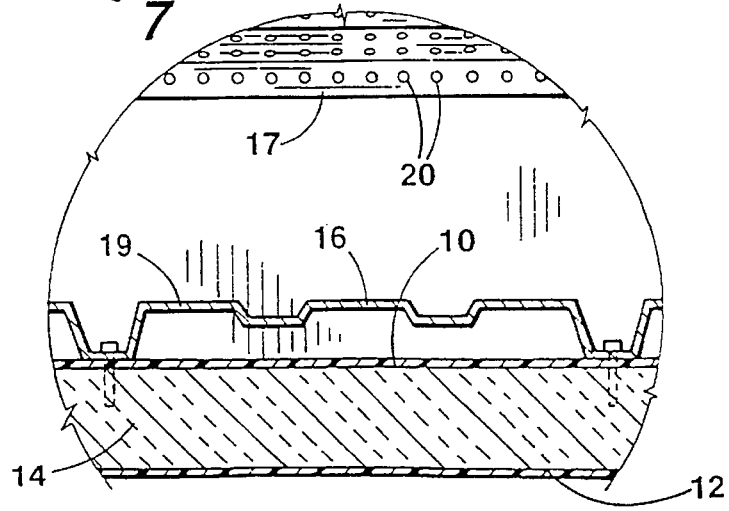
FIG. 7 provides an enlargement of the section 7 designated in FIG. 6.
Figure 8:
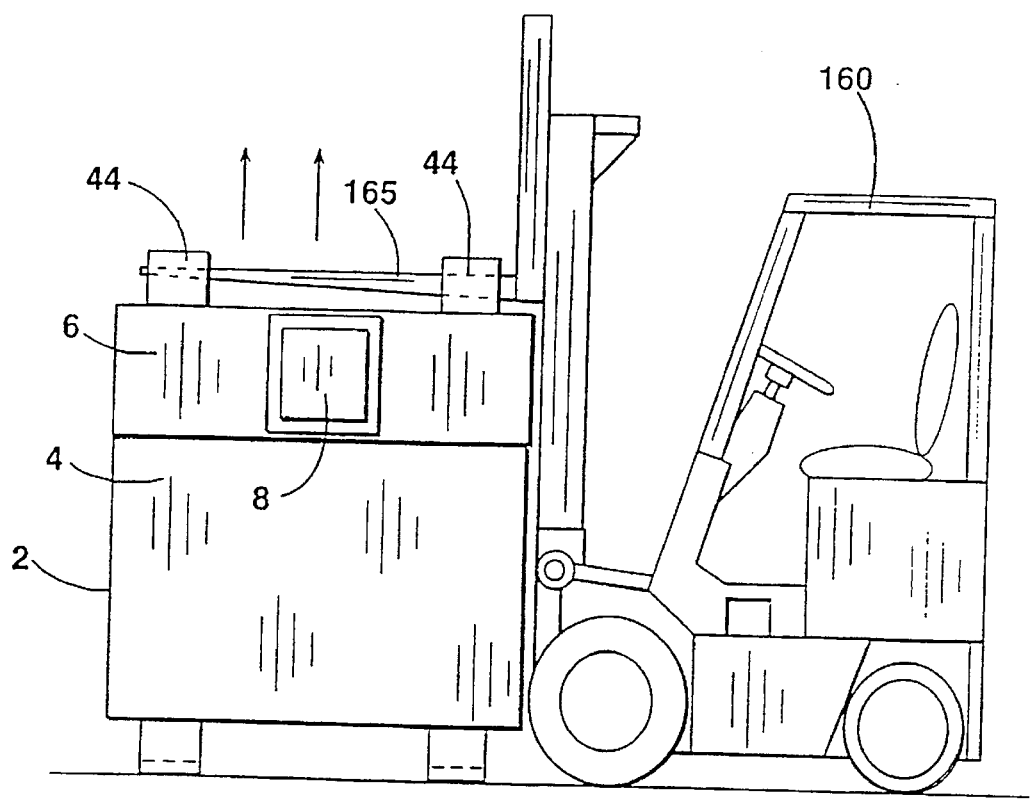
FIG. 8 depicts a forklift 160 being used to remove the cover 6 of inventive apparatus 2.
Figure 9:
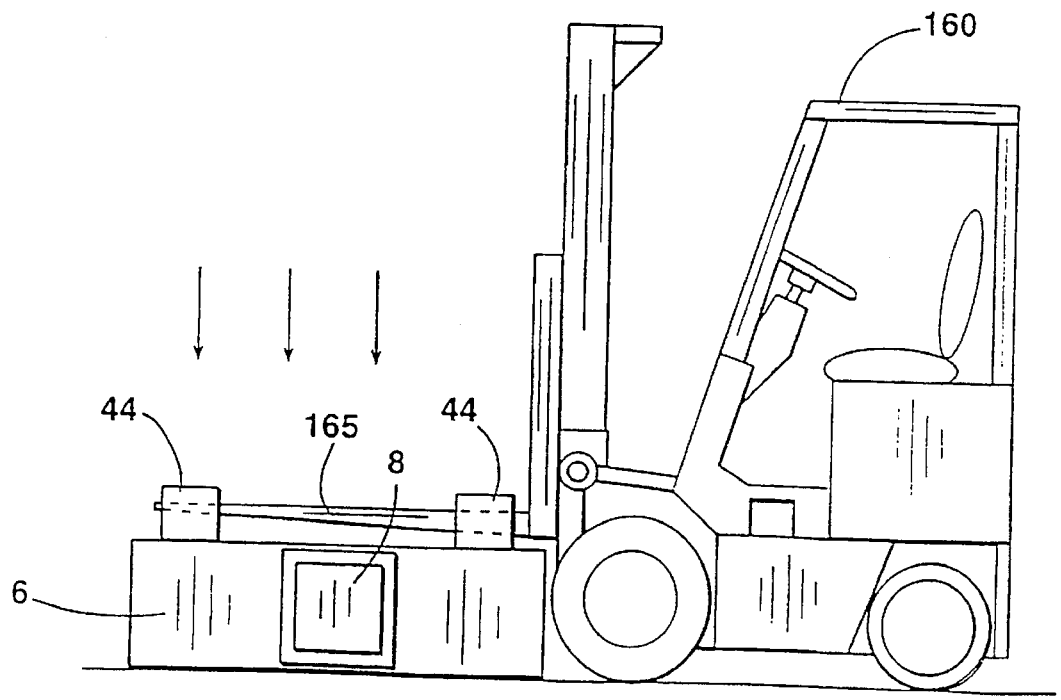
FIG. 9 depicts forklift 160 placing cover 6 on the ground.
Figure 10:
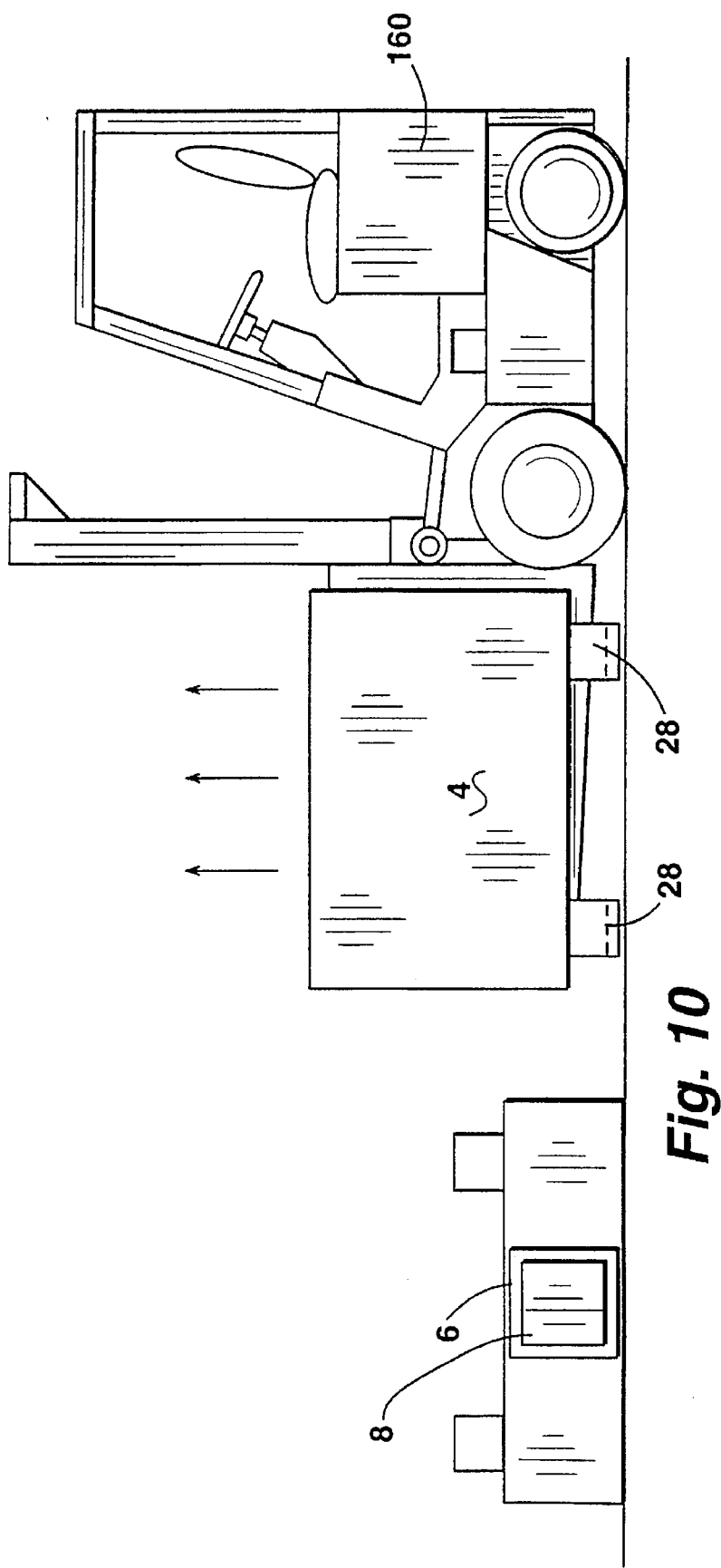
FIG. 10 depicts forklift 160 lifting box 4 of inventive apparatus 2.
Figure 11:
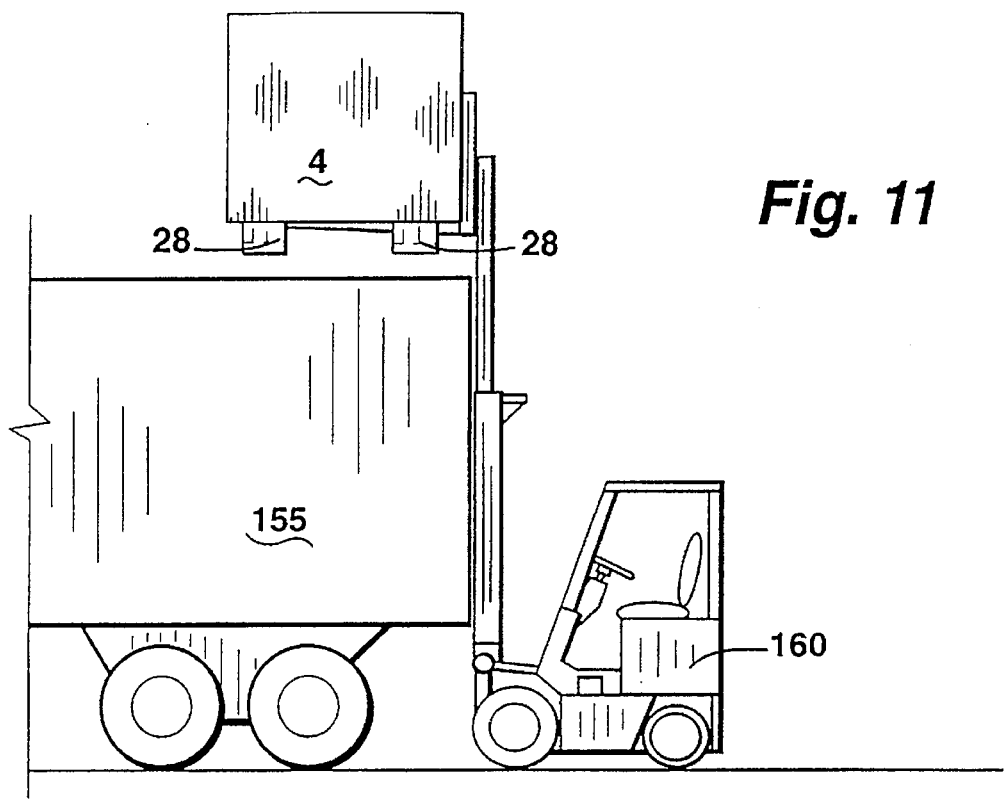
FIG. 11 depicts forklift 160 lifting freezer box 4 above the trailer of a transport truck 155.
Figure 12:
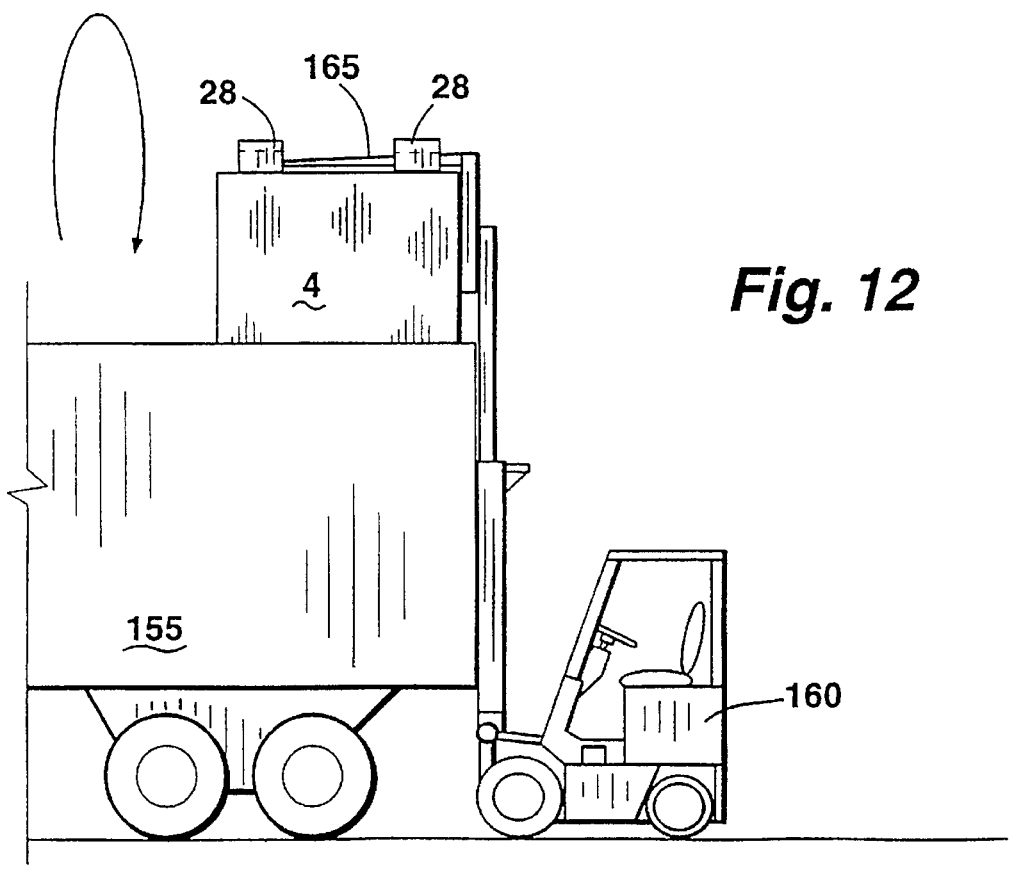
FIG. 12 depicts box 4 in a pivoted position for dumping the contents thereof into the trailer of transport truck 155.
Figure 13:
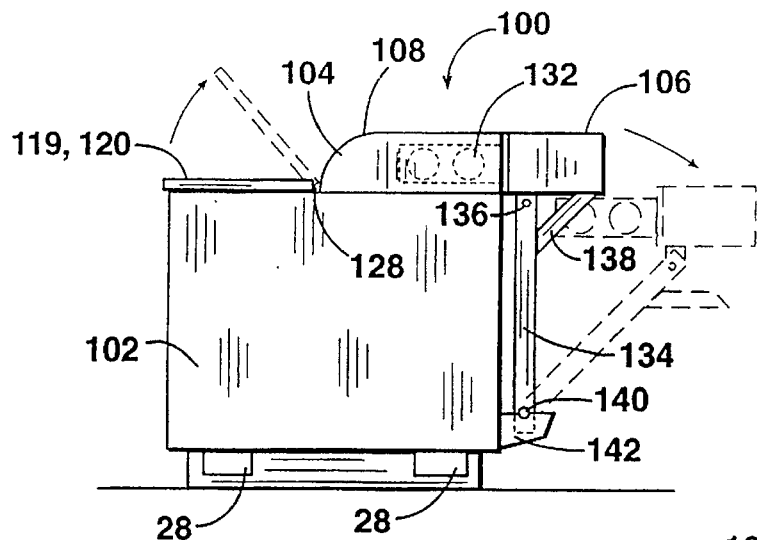
FIG. 13 provides an elevational side view of an embodiment 100 of the inventive freezing apparatus.
Figure 16:
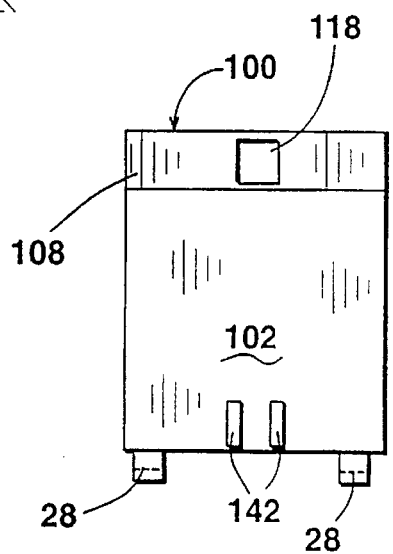
FIG. 16 provides an elevational back view of inventive apparatus 100 wherein freezing unit 106 has been removed therefrom.
Figure 14:
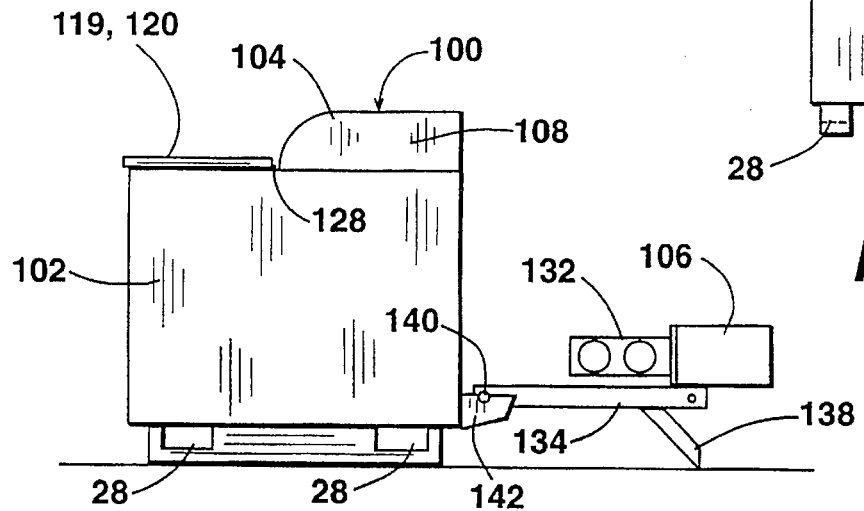
FIG. 14 provides an elevational side view of inventive apparatus 100 wherein freezing unit 106 is being removed therefrom.
Figure 15:
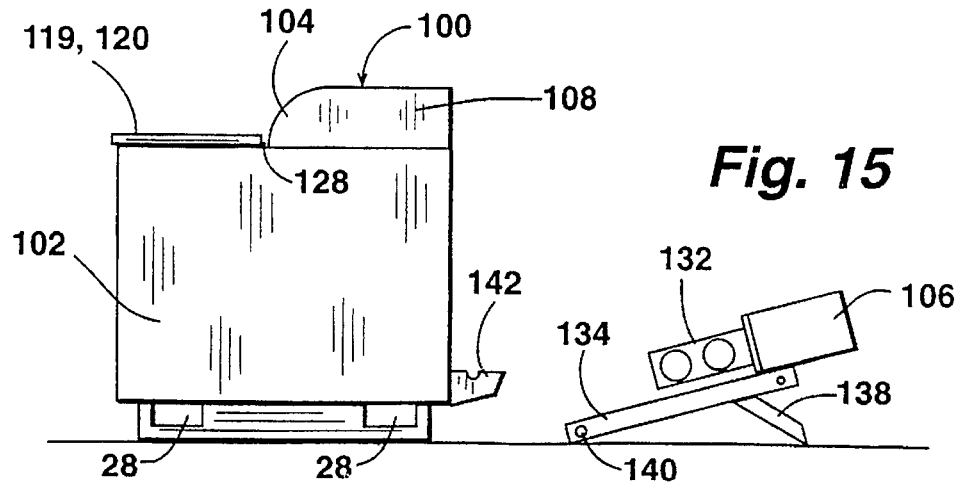
FIG. 15 provides an elevational side view of inventive apparatus 100 wherein freezing unit 106 has been removed therefrom.

As depicted in FIGS. 3–5, freezing unit 8 preferably includes: a cooling and circulation means 60 which is removably receivable in port 54 of cover 6 such that the cooling and circulation means 60 extends into the dome-shaped interior of cover 6; a condenser coil and corresponding condenser fan 68 which remain outside of cover 6 when cooling and circulation means 60 is received in port 54; a mounting bracket 72 provided on the exterior of freezing unit 8 between cooling and circulation means 60 and condensing means 68 for securing freezing unit 8 to cover 6 using bolts or similar means; and an electrical connection 74 extending from freezing unit 8 for providing electrical power to the freezing unit. Although an AC electrical connection is shown, it will be noted that freezing unit 8 can be battery operated or can be operated using generally any power source commonly employed for operating freezer units. An insulation layer (not shown) is also preferably provided inside freezing unit 8 between the portion of freezing unit 8 which is received in port 54 and the portion of freezing unit 8 which remains outside of port 54. Additionally, a standard air seal (not shown) is preferably positioned between mounting bracket 72 and cover 6 for sealing the connection between freezing unit 8 and cover 6.

Freezing unit 8 is preferably thermostatically controlled in order to maintain a temperature in the range of from about 10° F. to about 20° F. inside freezing apparatus 2.

Cooling and circulation means 60 preferably comprises an evaporator coil 62 and at least one air fan 64 associated with coil 62. By positioning cooling and circulation means 60 inside the dome-shaped interior 42 of cover 6, air circulation and air cooling within freezing apparatus 2 is greatly facilitated. Cooling and circulation means 60 operates to circulate cold air above the carcasses deposited in freezer box 4. Cooling and circulation means 60 also operates to circulate cold air behind false walls 16 and beneath false bottom 17 such that cold air flow is maintained around and beneath the carcasses deposited in box 4. This cold air circulation above, around, and beneath the carcass material operates to quickly freeze additional carcasses placed in inventive freezing apparatus 2 and to ensure that carcasses positioned near the bottom and sides of freezer box 4 remain frozen throughout the frozen storage period.

A prototype of inventive freezing apparatus 2 constructed for testing purposes had a total interior volume of about 66 ft$^3$ and an air fan 64 capacity of 750 cubic feet per minute. Thus, when empty, the prototype unit had an interior air recycle rate of more than 10 air changes per minute. The prototype unit also had a load capacity of about 2000 pounds of poultry (i.e., chicken) carcass material and was operable for freezing up to about 200 pounds of new carcass material over a period of about 24 hours.

When inventive freezing apparatus 2 is used in the inventive carcass storage and processing method, carcasses are placed in apparatus 2 throughout the animal growth cycle as fatalities occur. Each carcass added to inventive apparatus 2 is frozen and stored in apparatus 2. As the total carcass volume within apparatus 2 increases, the remaining air volume within the freezing apparatus decreases. Consequently, since the air flow capacity of the cooling and circulation means 60 remains constant, the air turnover rate within the box increases as additional carcass material is placed therein. This increased air circulation rate matches animal growth cycles very well since the carcasses placed in the freezing apparatus near the end of the growth cycle will generally be significantly larger than the carcasses which were placed in the freezing apparatus near the beginning of the growth cycle. The increased air circulation rate within the freezing apparatus near the end of the growth cycle thus facilitates the rapid freezing of the larger carcasses.

Freezing unit 8 used in inventive apparatus 2 also preferably includes an automatic defrosting mechanism. Generally any standard defrosting system used in the art can be employed in inventive apparatus 2. Examples of such systems include small, intermittently operated electric heaters positioned adjacent the evaporative coil and intermittently operated hot gas reverse cycle defrost systems.

Freezing unit 8 is preferably mounted on cover 6 such that freezing unit 8 slopes downward away from cover 6 at an angle of about 2°. With freezing unit 8 sloped in this manner, any ice which melts during the intermittent defrosting process will drip into a pan on the bottom of freezing unit 8 and then drain toward the exterior of the freezing unit. Since the defrosting operation product is extremely small, it presents no substantial environmental concern. However, if desired, this product can be collected and treated in order to completely eliminate any possible negative environmental impact.

A second embodiment 100 of the inventive freezing apparatus is depicted in FIGS. 13–16. Inventive apparatus 100 comprises a freezer box 102, a cover 104, and a cooling/freezing unit 106. Freezer box 102 is substantially identical to freezer box 4 of inventive freezing apparatus 2.

Cover 104 of inventive freezing apparatus 100 includes a dome-shaped portion 108 having a dome-shaped interior. As with cover 6, the dome-shaped portion of cover 104 preferably comprises an outer wall, an inner wall, and an insulation layer provided between the outer wall and the inner wall. The outer and inner walls of cover 104 are preferably formed from fiberglass or a plastic material such as polyethylene. The insulation layer provided in cover 104 can be a polyurethane foam material or generally any other type of insulation material used in constructing freezer systems.

A port 118 is provided in the back of dome-shaped portion 108 for operably associating freezing unit 106 with cover 104. Cover 104 further includes a hatch 119 and a lid 120. Lid 120 is connected to cover 106 by means of a hinge 128 for closing and opening hatch 119.

As does hatch cover 48 of apparatus 2, lid 120 comprises an outer wall, an inner wall, and an insulation layer positioned between the inner wall and the outer wall. A standard air seal is also preferably positioned between lid 120 and cover 104 for sealing hatch 119.

Freezing unit 106 is preferably a freezing unit of generally the same construction as freezing unit 8 of inventive apparatus 2. Freezing unit 106 includes a cooling and circulation means 132 which extends through port 118 and into the dome-shaped interior of cover 104.

Freezing unit 106 preferably also includes: a mounting post 134 which is pivotably connected to the exterior portion of freezing unit housing by means of a hinge 136; an angled brace 138 extending from mounting post 134 such that the far exterior portion of the freezing unit housing rests on brace 138 when freezing unit 106 is mounted on the inventive freezing apparatus; and mounting pins 140 extending outwardly from the bottom portion of mounting post 134.

Mounting pins 140 are receivable in mounting support arms 142 provided on the lower back portion of freezer box 102. Freezing unit 106 is preferably mounted on inventive apparatus 100 by placing mounting pins 140 in mounting support arms 142 and then pivoting freezing unit 106 upward and toward cover 104 such that cooling and circulation means 132 is fully received in port 118 and the back exterior portion of the freezing unit housing rests on brace 138.

Freezing unit 106 can be secured to cover 104 by bolting or by generally any other suitable mechanical attachment means. For example, attachment rings can be provided on the exterior of cover 4 and freezing unit 106 can include a mounting bracket having slots formed therein such that, when cooling and circulation means 132 is properly positioned inside cover 104, the attachment rings extend through the mounting bracket slots. With the attachment rings thus extending through the mounting bracket, pins can be placed through the attachment rings to thereby retain freezing unit 106 in operable engagement with cover 104.

A standard seal is preferably provided between freezing unit 106 and cover 104 for sealing the connection between freezing unit 106 and cover 104.

The positioning of cooling and circulation means 132 in the dome-shaped interior portion of cover 104 substantially enhances the internal cold air circulation characteristics of inventive apparatus 100.

Cover 104 is preferably bolted or otherwise releasably and firmly secured to box 102. If desired, frozen material stored in freezer box 102 can be dumped in substantially the same manner as described above for freezer box 4 by completely removing cover 104 from box 102. However, the frozen contents of inventive freezing apparatus 100 are preferably dumped by (a) removing freezing unit 106 from apparatus 100 and then (b) lifting and rotating freezing apparatus 100 by means of a forklift or similar lifting means associated with captive-type forklift pockets 28. Inventive apparatus 100 is preferably lifted and rotated such that lid 120 swings open and the frozen contents of freezer box 102 fall through hatch 119.

As indicated above, the inventive carcass storage and processing method can be used in conjunction with generally any poultry or other livestock grow-out operation. As fatalities occur, the animal carcasses are placed inside a freezer wherein they are frozen and stored. The freezer is preferably located on the farm at a convenient site near the grow-out operation. At any desired time during or after the grow-out operation, the frozen carcass material collected in the freezer can be transported to a rendering plant or other processing facility.

When the inventive method is used in conjunction with a chicken grow-out operation or in conjunction with other types of small animal grow-out operations, all of the carcass material collected in the freezer over the course of the operation will preferably be stored in the freezer until the growth cycle is completed. Storing all of the frozen carcass material at the farm site until the end of the grow-out operation minimizes handling and transportation costs. When inventive freezers of the type described hereinabove are used in conducting the inventive method, additional freezers can easily be brought to the farm site as needed to provide further frozen storage capacity.

At the rendering facility, the carcass material will typically be chopped into pieces having a preselected size. The chopped material is then cooked in a pressurized, continuous, closed tank-type cooker. The cooker will typically be equipped with agitators and jacketed with steam coils. The cooking temperature will vary depending upon the type of carcass material being rendered. The cooking temperature used for rendering chicken carcasses, for example, will typically be in the range of from about 250° F. to about 275° F.

The rendering process yields a dry, solid product and a tallow product. The solid product can be powdered (using, e.g., a fine chopper and a hammer mill) to yield a valuable meat and bonemeal product which is useful as a high protein animal feed supplement. The tallow product can be used as an animal feed supplement and taste additive.

As indicated above, inventive freezers 2 and 100 are ideally suited for use in the inventive method, particularly in conjunction with chicken and other small animal grow-out operations. As fatalities occur, the animal carcasses can be placed in freezing apparatus 2 or in freezing apparatus 100 by simply opening hatch 46 or hatch 119 and then tossing the carcasses into the freezer box.

As depicted in FIGS. 8–12 and 17–19 and as discussed above, a truck and forklift system can be used for handling and dumping the inventive freezer systems. As shown in FIGS. 17–19, a forklift 160 can be conveniently carried by a collection and transport truck 155 from farm site to farm site.

Alternatively, a boom arm-type arrangement installed on the collection and transport truck can be used for handling and dumping the freezer systems. The use of a truck and forklift system is preferred over the use of the boom arm system since the truck and forklift system allows much greater flexibility and convenience in the placement of freezer systems at the farm site. If a boom arm system is used, the freezer systems must be located such that the collection and transport truck can be parked immediately adjacent the freezers.

As shown in FIGS. 8–12 and 17–19, when inventive freezing apparatus 2 is used in the inventive method, the frozen carcass material collected in freezer box 4 is preferably dumped into collection and transport truck 155 by: (1) releasing mechanical latches 58 such that cover 6 is no longer secured to freezer box 4; (2) placing arms 165 of forklift 160 in forklift pockets 44 provided on top of cover 6; (3) lifting cover 6 using forklift 160 and removing cover 6 from freezer box 4; (4) placing lifting arms 165 of forklift 160 in forklift pockets 28 located on the bottom of box 4; and then (5) moving, lifting, and rotating freezer box 4 using forklift 160 such that the frozen carcass material contained in box 4 is dumped into truck 155. After completing the dumping operation, freezer box 4 will preferably be returned to a desired on-site location and cleaned and cover 6 will be placed on box 4 and reattached thereto.

If inventive freezing apparatus 100 is used in the inventive method, the frozen carcass material collected in freezer box 102 is preferably dumped into collection and transport truck 155 by: (1) removing freezing unit 106 from cover 104 and box 102; (2) placing arms 165 of forklift 160 into forklift pockets 28 located on the bottom of freezer box 102; and then (3) moving, lifting, and rotating freezing apparatus 100 using forklift 160 such that lid 120 swings open and the frozen carcass material contained in box 102 falls out of hatch 119 and into truck 155. After completing the dumping operation, freezing apparatus 100 will preferably be returned to a desired on-site location and cleaned and freezing unit 106 will be reattached thereto.

As will be understood by those skilled in the art, other types of freezers can be used in the practice of the present invention. For example, large animal carcasses can be hung and stored in more sizable walk-in-type freezers. Small animal carcasses can also be stored in larger walk-in-type freezers by collecting the carcasses in baskets or crates positioned within such freezers. Collection hatches can be installed in the sides of the large freezers to provide a quicker and more energy efficient means of depositing small animal carcasses in the freezer baskets contained therein. When desired, loaded baskets can be removed from the freezer and the frozen carcass material contained in the baskets can be dumped into a collection and transport truck. Alternatively, the loaded baskets can be used for carrying the frozen carcass material to the processing facility by simply loading and/or stacking the baskets on the transport truck.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for cooling and containing a material, said apparatus comprising:

a container having an interior, a top portion, and an opening provided in said top portion;

a covering means for at least partially covering said opening, said covering means including an interior cavity, a wall, and a port provided through said wall; and a cooling means, securable to said covering means, for cooling said interior of said container, said cooling means comprising a housing, an air cooling and circulating means, secured to said housing, for cooling and circulating air, and a coolant condensing means, secured to said housing, for condensing a coolant used in said cooling means, wherein, when said cooling means is secured to said covering means, a first portion of said housing is inserted through said port such that said air cooling and circulating means is positioned inside said interior cavity of said covering means and said coolant condensing means is positioned adjacent to and outside of said covering means.

2. The apparatus of claim 1 wherein said air cooling and circulating means comprises a cooling element and a fan.

3. the apparatus of claim 2 wherein said coolant condensing means comprises a condenser coil.

4. The apparatus of claim 1 wherein said cooling means is a freezing unit which is operable for providing freezing conditions in said interior of said container.

5. The apparatus of claim 1 wherein:
said container includes an interior wall and an interior bottom and
said apparatus further comprises circulation facilitating means, positioned in said interior of said container, for facilitating air circulation across said interior wall and over said interior bottom.

6. The apparatus of claim 5 wherein said circulation facilitating means comprises:
a false wall secured in said interior of said container adjacent to said interior wall such that an air circulation gap is provided between said false wall and said interior wall and
a false bottom secured in said interior of said container adjacent to said interior bottom such that an air circulation gap is provided between said false bottom and said interior bottom.

7. The apparatus of claim 1 wherein said covering means further comprises:
a hatch for delivering said material into said interior of said container and
a hatch covering means for opening and closing said hatch.

8. The apparatus of claim 1 further comprising a plurality of forklift pockets provided on said container such that a forklift can be used to lift and rotate said container whereby said material, when contained in said interior of said container, will fall out of said opening in said top portion of said container.

9. The apparatus of claim 1 wherein:
said covering means is removably positionable on said top portion of said container and
said apparatus further comprises handling means for handling said covering means such that said covering means can be placed on and removed from said top portion of said container.

10. The apparatus of claim 9 wherein said handling means comprises a plurality of forklift pockets provided on said covering means.

11. The apparatus of claim 1 further comprising securing means for securing said housing to said covering means such that said air cooling and circulating means is thereby positioned inside said interior cavity of said covering means and said coolant condensing means is positioned adjacent to and outside of said covering means.

12. The apparatus of claim 1 wherein said covering means can be selectively placed on and removed from said top portion of said container without retracting said first portion of said housing from said port provided through said wall of said covering means.

13. An apparatus for cooling and containing a material, said apparatus comprising:

a container having an interior, a top portion, and an opening provided in said top portion;
a cooling means for cooling said interior of said container; and
container handling means, provided on said container, for handling said container so that said container can be lifted and rotated in a manner whereby said material, when contained in said interior of said container, will fall out of said opening.

14. The apparatus of claim 13 wherein said container handling means comprises a plurality of forklift pockets.

15. The apparatus of claim 13 wherein said apparatus further comprises a cover positionable over said opening, said cover including a hatch through which said material can be delivered into said interior of said container and a hatch covering means for opening and closing said hatch.

16. The apparatus of claim 15 wherein:
said cover is removably positionable on said top portion of said container and
said apparatus further comprises cover handling means, provided on said cover, for handling said cover such that said cover can be placed on and removed from said top portion of said container.

17. The apparatus of claim 16 wherein said cover handling means comprises a plurality of forklift pockets.

18. The apparatus of claim 13 wherein:
said apparatus further comprises a cover positionable over said opening, said cover including a wall and a port provided through said wall and
said cooling means is associatable with said port such that said cooling means is operable for circulating cooled air within said interior of said container.

19. The apparatus of claim 18 wherein:
said cover is removably positionable on said top portion of said container and
said apparatus further comprises cover handling means, provided on said cover, for handling said cover such that said cover can be placed on and removed from said top portion of said container.

20. The apparatus of claim 19 wherein said cover handling means comprises a plurality of forklift pockets.

21. The apparatus of claim 19 further comprising securing means for securing said cooling means to said cover.

22. The apparatus of claim 21 wherein said cover can be selectively placed on and removed from said top portion of said container using said cover handling means while said cooling means is secured by said securing means to said cover.

23. The apparatus of claim 22 wherein:
said cover further includes an interior cavity;
said cooling means comprises
a housing,
an air cooling and circulating means, secured to said housing, for cooling and circulating air, and
a coolant condensing means, secured to said housing, for condensing a coolant used in said cooling means; and
when said cooling means is secured by said securing means to said cover, a first portion of said housing is received through said port such that said air cooling and circulating means is positioned inside said interior cavity of said cover and said coolant condensing means is positioned adjacent to and outside of said cover.

24. An apparatus for cooling and containing a material, said apparatus comprising:

a container having an interior, a top portion, and an opening provided in said top portion;

a cooling means for cooling said interior of said container;

a container cover removably positionable on said top portion of said container over said opening; and handling means, provided on said container cover, for selectively placing said container cover on and removing said container cover from said top portion of said container using a forklift.

25. The apparatus of claim 24 wherein said handling means comprises a plurality of forklift pockets provided on said container cover.

26. The apparatus of claim 24 wherein said container cover includes a hatch for delivering said material into said interior of said container and a hatch cover for opening and closing said hatch.

27. The apparatus of claim 26 further comprising securing means for securing said cooling means to said container cover.

28. The apparatus of claim 27 wherein said container cover can be selectively placed on and removed from said top portion of said container using said handling means while said cooling means is secured to said container cover by said securing means.

29. The apparatus of claim 27 wherein:

said container cover further includes an interior cavity, a wall, and a port provided through said wall;

when said container cover is placed on said top portion of said container, said interior cavity of said container cover is thereby placed in fluid communication with said interior of said container; and said securing means is operable for securing said cooling means in association with said port such that said cooling means is operable for circulating cooled air through said interior cavity of said container cover and through said interior of said container.

30. The apparatus of claim 24 further comprising container handling means, provided on said container, for lifting and rotating said container using a forklift such that said material, when contained in said interior of said container, will fall out of said opening.

31. An apparatus for freezing and containing a material, said apparatus comprising:

a container having an interior, a top portion, and an opening provided in said top portion;

a container cover removably positionable on said top portion of said container over said opening, said container cover including a hatch for delivering said material into said interior of said container, a hatch cover for opening and closing said hatch, an interior cavity which is positioned in fluid communication with said interior of said container when said container cover is placed on said top portion of said container, a wall, and a port provided through said wall;

a freezing unit comprising a housing, an air cooling and circulating means, secured to said housing, for cooling and circulating air, and a coolant condensing means, secured to said housing, for condensing a coolant used in said freezing unit;

securing means for securing said freezing unit to said container cover such that a first portion of said housing is received through said port, said air cooling and circulating means is thereby positioned inside said interior cavity of said container cover and is operable for circulating cooled air through said interior cavity of said cover and through said interior of said container, and said coolant condensing means is positioned adjacent to and outside of said container cover;

container handling means, provided on said container, for handling said container such that said container can be lifted and rotated in a manner whereby said material, when placed in said interior of said container, will fall out of said opening; and cover handling means, provided on said container cover, for handling said container cover such that said container cover can be selectively placed on and removed from said top portion of said container.

32. The apparatus of claim 31 wherein:

said container handling means comprises a plurality of forklift pockets and said cover handling means comprises a plurality of forklift pockets.

33. The apparatus of claim 31 wherein said container cover can be removed from said top portion of said container while said freezing unit is secured by said securing means to said container cover.

* * * * *